(12) United States Patent
Cai

(10) Patent No.: US 8,798,128 B2
(45) Date of Patent: Aug. 5, 2014

(54) METHOD AND DEVICE FOR SIGNAL PROCESSING AND APPLIED TO MICROWAVE COMMUNICATION SYSTEM

(71) Applicant: Huawei Technologies Co., Ltd., Guangdong (CN)

(72) Inventor: Meng Cai, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/728,876

(22) Filed: Dec. 27, 2012

(65) Prior Publication Data
US 2013/0202022 A1    Aug. 8, 2013

Related U.S. Application Data

(63) Continuation of application No. PCT/CN2012/070865, filed on Feb. 3, 2012.

(51) Int. Cl.
H03H 7/30    (2006.01)
H03H 7/40    (2006.01)
H03K 5/159    (2006.01)

(52) U.S. Cl.
USPC .......................................... 375/232

(58) Field of Classification Search
None
See application file for complete search history.

(56) References Cited

U.S. PATENT DOCUMENTS 5,386,239 A * 1/1995 Wang et al. ............ 348/472
5,757,239 A   5/1998 Gilmore 2004/0137863 A1 * 7/2004 Walton et al. ............ 455/130
2006/0227891 A1  10/2006 Niu et al.
2008/0101497 A1 * 5/2008 Gaikwad et al. ........... 375/267
2009/0274253 A1  11/2009 Krasny et al.
2011/0135043 A1   6/2011 Downey et al.

FOREIGN PATENT DOCUMENTS

CN   1178613 A    4/1998
CN   1853340 A   10/2006
CN  101136731 A    3/2008

OTHER PUBLICATIONS

International Search Report and Written Opinion of the International Searching Authority dated February Feb. 3, 2012 in connection with International Patent Application No. PCT/CN2012/070865.
Wenzhen Li, et al., "A New Receiver Architecture for Joint Carrier, Channel, and Data Estimation for High-rate WPAN Systems", IEEE Venicular Technology Conference Proceedings, Sep. 24-28, 2002, p. 1637-1641.

* cited by examiner

*Primary Examiner* — Chieh M Fan
*Assistant Examiner* — Wednel Cadeau (57) ABSTRACT

A method and a device which are for signal processing and are applied to a microwave communication system are disclosed. The method includes: performing equalization processing on each input signal by using an equalizer so as to obtain an equalized signal corresponding to the each input signal; performing phase estimation on phase noise in the equalized signal to obtain an estimated phase of the phase noise; performing phase rotation on the equalized signal to offset the estimated phase of the phase noise, so as to obtain a phase rotation signal; suppressing residual phase noise in the phase rotation signal by using a phase-locked loop so as to output an error signal and a received signal; and performing an iterative update on a filter coefficient of the equalizer by using the error signal.

14 Claims, 8 Drawing Sheets

METHOD AND DEVICE FOR SIGNAL PROCESSING AND APPLIED TO MICROWAVE COMMUNICATION SYSTEM

CROSS-REFERENCE TO RELATED APPLICATIONS

This application is a continuation of International Application No. PCT/CN2012/070865, filed on Feb. 3, 2012, which is hereby incorporated by reference in its entirety.

TECHNICAL FIELD

The present invention relates to the field of data signal processing, and in particular, to a method and a device which are for signal processing and are applied to a microwave communication system.

BACKGROUND

In a microwave communication system (Microwave Communication System), signals are generally transmitted by applying a multi input multi output (Multi input Multi output, MIMO) technology to improve a utilization ratio of a channel spectrum, thereby achieving the purpose of expanding transmission capacity. In actual application, in general, a channel of the microwave communication system is a line of sight (Line of Sight, LOS) channel, a channel matrix is not completely orthogonal in this environment, and the number of channel conditions is seriously sick, and therefore, it is difficult to support a relatively independent data stream. Moreover, phase noise of the microwave communication system is more serious than that of a wireless communication system, and how to effectively suppress the phase noise so as to improve the performance of the whole microwave communication system is always a research hotspot in this field.

The existing phase noise suppression architecture is usually applied to a receiver of the microwave communication system. In general, the existing phase noise suppression architecture is formed by a space-time equalizer, a phase-locked loop, and a combiner, and its working process is summarized as follows: the space-time equalizer receives each input signal, performs equalization processing on the each input signal, and outputs an equalized signal to the phase-locked loop; the phase-locked loop suppresses the phase noise of the each signal output by the space-time equalizer; and multiple channels of signals output by the phase-locked loop are superposed by the combiner to obtain a received signal.

In the foregoing phase noise suppression architecture, the phase noise suppression depends on the bandwidth of the phase-locked loop. The phase-locked loop is caused to be divergent if the bandwidth of the phase-locked loop is set to be too large. Therefore, the bandwidth of the phase-locked loop is set to be relatively narrow under the normal circumstance, thereby limiting suppression capability on the phase noise.

SUMMARY

Embodiments of the present invention provide a method and a device which are for signal processing and are applied to a microwave communication system, which are capable of effectively improving suppression capability on phase noise under a condition that a bandwidth of a phase-locked loop is relatively narrow.

A signal processing method applied to a microwave communication system includes:
performing equalization processing on each input signal by using an equalizer so as to obtain an equalized signal corresponding to the each input signal;
performing phase estimation on phase noise in the equalized signal to obtain an estimated phase of the phase noise;
performing phase rotation on the equalized signal to offset the estimated phase of the phase noise, so as to obtain a phase rotation signal;
suppressing residual phase noise in the phase rotation signal by using a phase-locked loop so as to output an error signal and a received signal; and
performing an iterative update on a filter coefficient of the equalizer by using the error signal.

A signal processing method applied to a microwave communication system includes:
performing phase noise estimation on each input signal to obtain a phase noise estimation value of the input signal;
performing channel estimation on the input signal by using the phase noise estimation value so as to obtain a channel estimation value;
sending the channel estimation value into an equalizer so as to enable the equalizer to perform fast convergence by using the channel estimation value;
performing equalization processing on the each input signal by using the equalizer so as to obtain an equalized signal corresponding to the each input signal;
suppressing phase noise in the equalized signal by using a phase-locked loop so as to output an error signal and a received signal; and
performing an iterative update on a filter coefficient of the equalizer by using the error signal.

A signal processing device applied to a microwave communication system includes:
an equalizer, configured to perform equalization processing on each input signal to obtain an equalized signal corresponding to the each input signal, and output the equalized signal to a phase estimator and a signal rotator;
the phase estimator, configured to perform phase estimation on phase noise in the equalized signal to obtain an estimated phase of the phase noise and output the estimated phase to the signal rotator;
the signal rotator, configured to perform phase rotation on the equalized signal to offset the estimated phase of the phase noise, so as to obtain a phase rotation signal and output the phase rotation signal to a phase-locked loop; and
the phase-locked loop, configured to suppress residual phase noise in the phase rotation signal so as to output an error signal and a received signal,
where the equalizer is further configured to perform an iterative update on a filter coefficient of the equalizer by using the error signal.

A signal processing device applied to a microwave communication system, including:
a phase noise estimator, configured to perform phase noise estimation on each input signal to obtain a phase noise estimation value of the input signal;
a multi-path channel estimator, configured to perform channel estimation on the input signal by using the phase noise estimation value, so as to obtain a channel estimation value and send the channel estimation value into an equalizer;
the equalizer, configured to perform equalization processing on the each input signal to obtain an equalized signal corresponding to the input signal and output the equalized signal to a phase-locked loop, and perform fast convergence by using the channel estimation value; and the phase-locked loop, configured to suppress phase noise in the equalized signal to output an error signal and a received signal, where the equalizer is further configured to perform an iterative update on a filter coefficient of the equalizer by using the error signal.

In one of the foregoing solutions, first, the phase estimation is performed on the phase noise in each equalized signal output by the equalizer so as to obtain the estimated phase of the phase noise; secondly, before the equalized signal is input into the phase-locked loop, the phase rotation is performed on the equalized signal to offset the estimated phase of the phase noise, so as to obtain the phase rotation signal and input the phase rotation signal into the phase-locked loop; and the phase-locked loop further suppresses the residual phase noise in the phase rotation signal, and outputs the error signal and the received signal. Since the phase rotation is performed on the each equalized signal to offset the estimated phase of the phase noise, which can filter out most of the phase noise in the equalized signal, the residual phase noise in the phase rotation signal may be suppressed by using the phase-locked loop with a relatively narrow bandwidth, so that suppression capability on phase noise can be effectively improved in the embodiment of the present invention under the condition that the bandwidth of the phase-locked loop is relatively narrow.

In another one of the foregoing solutions, the phase noise estimation is performed on the each input signal to obtain the phase noise estimation value of the input signal, the channel estimation is performed on the input signal by using the phase noise estimation value of the input signal so as to obtain the channel estimation value, the channel estimation value is sent into the equalizer, and the equalizer performs the fast convergence by using the channel estimation value of the input signal. At the same time, the equalization processing is performed on the each input signal by using the equalizer so as to obtain the equalized signal corresponding to the input signal, the phase noise in the equalized signal is suppressed by using the phase-locked loop so as to output the error signal and the received signal. The influence of the phase noise is considered during the channel estimation, so that the precision of the channel estimation is effectively improved, and the improvement of the precision of the channel estimation facilitates the fast convergence of the equalizer, thereby reducing a bit error rate of the system.

BRIEF DESCRIPTION OF THE DRAWINGS

To describe the technical solutions in the embodiments of the present invention or in the prior art more clearly, the accompanying drawings required in the description of the embodiments are briefly introduced in the following. Apparently, the accompanying drawings in the following description are only some embodiments of the present invention, and persons of ordinary skill in the art can further derive other drawings according to these drawings without making creative efforts.

DETAILED DESCRIPTION

The technical solutions in the embodiments of the present invention are described clearly and completely in the following with reference to the accompanying drawings in the embodiments of the present invention. Apparently, the described embodiments are only some embodiments of the present invention, rather than all embodiments of the present invention. Based on the embodiments of the present invention, all other embodiments obtained by persons of ordinary skill in the art without making any creative effort shall fall within the protection scope of the present invention.

Embodiment 1

Figure 1:
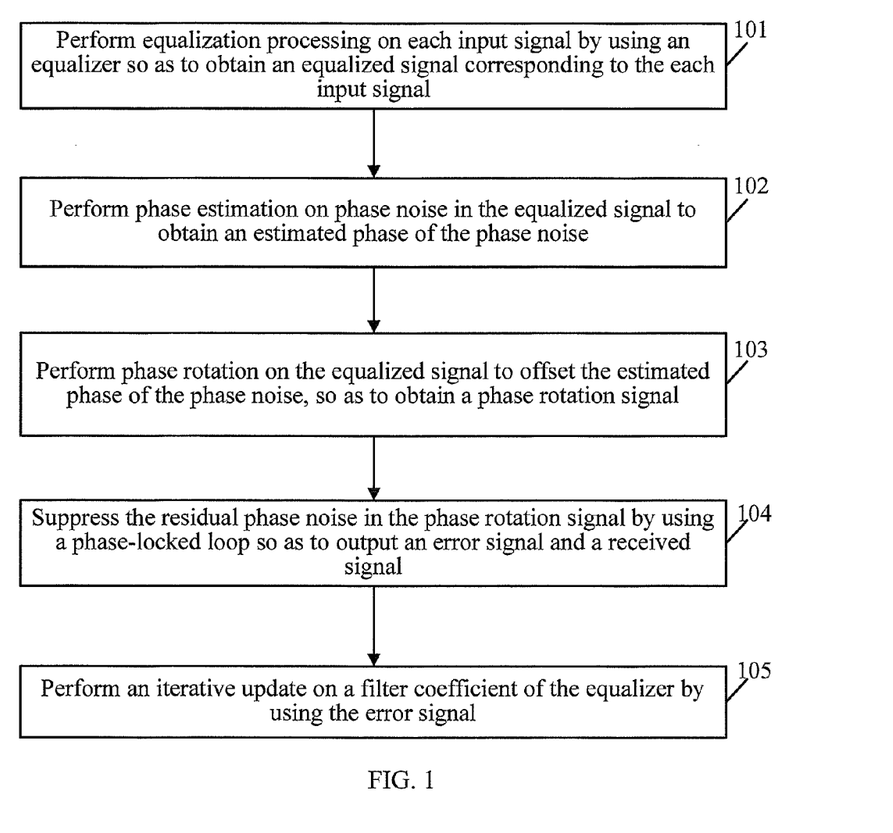
FIG. 1 is a flow chart of a signal processing method applied to a microwave communication system according to an embodiment of the present invention.

Referring to FIG. 1, FIG. 1 is a flow chart of a signal processing method applied to a microwave communication system according to Embodiment 1 of the present invention. As shown in FIG. 1, the method may include the following steps:

101: Perform equalization processing on each input signal by using an equalizer so as to obtain an equalized signal corresponding to the each input signal.

As an optional implementation manner, the signal processing method applied to the microwave communication system according to Embodiment 1 of the present invention may be specifically applied in an MIMO transmission environment of the microwave communication system. In the MIMO transmission environment, the equalizer may receive multiple input signals at the same time, and perform the equalization processing on each input signal, respectively, so as to obtain the equalized signal corresponding to the each input signal. In the MIMO transmission environment, the equalizer in the foregoing step 101 may be a space-time equalizer.

As another optional implementation manner, the signal processing method applied to the microwave communication system according to Embodiment 1 of the present invention may be specifically applied in a single-carrier transmission environment of the microwave communication system. In the single-carrier transmission environment, the equalizer may receive one input signal, and perform the equalization processing on the input signal to obtain the equalized signal corresponding to the input signal. In the single-carrier transmission environment, the equalizer in the foregoing step 101 may be a time-domain equalizer or a frequency-domain equalizer, which is not limited in the embodiment of the present invention.

In the embodiment of the present invention, the purpose for the equalizer to perform the equalization processing on the input signal is to eliminate intersymbol interference of the input signal, so as to reduce a bit error rate of the system.

102: Perform phase estimation on phase noise in the equalized signal to obtain an estimated phase of the phase noise.

As an optional implementation manner, an implementation flow of the foregoing step 102 may be as follows:

1) performing a hard decision on the equalized signal to obtain a phase of the equalized signal after the hard decision;

2) calculating a phase difference between a phase of the equalized signal before the hard decision and the phase of the equalized signal after the hard decision; and 3) inputting the phase difference into a time-domain filter to perform an iterative update, so as to obtain the estimated phase of the phase noise in the equalized signal.

103: Perform phase rotation on the equalized signal to offset the estimated phase of the phase noise, so as to obtain a phase rotation signal.

In the embodiment of the present invention, the phase rotation is performed on the equalized signal to offset the estimated phase of the phase noise, which can filter out most of the phase noise in the equalized signal, so as to facilitate subsequently suppressing residual phase noise in the phase rotation signal by using a phase-locked loop with a relatively narrow bandwidth.

104: Suppress the residual phase noise in the phase rotation signal by using the phase-locked loop so as to output an error signal and a received signal.

105: Perform an iterative update on a filter coefficient of the equalizer by using the error signal.

As an optional implementation manner, when the number of input signals received by the equalizer in the foregoing step 101 are at least two, the method shown in FIG. 1 may further include the following steps:

by using a combiner, superposing all of received signals output by the phase-locked loop so as to form a received signal, where the number of the received signals output by the phase-locked loop is the same as the number of the input signals.

In actual application, in general, the channel of the microwave communication system is a multi-path channel, and when the multi-path degree is relatively high, the equalizer cannot be immediately converged, which causes a divergence of the phase-locked loop, so that the whole system cannot be converged, a serious bit error is generated, and the system even cannot work. To enable the equalizer to be converged fast, the method shown in FIG. 1 may further include the following steps:

1) performing phase noise estimation on each input signal to obtain a phase noise estimation value of the input signal;

2) performing channel estimation on the input signal by using the phase noise estimation value of the input signal so as to obtain a channel estimation value of the input signal; and 3) sending the channel estimation value of the input signal into the equalizer so as to enable the equalizer to perform fast convergence by using the channel estimation value of the input signal.

The equalizer trains pilot data in the input signal by using the channel estimation value of the input signal, thereby enabling the equalizer to be fast converged.

As an optional implementation manner, an implementation flow of the performing the phase noise estimation on the each input signal to obtain the phase noise estimation value of the input signal may be as follows:

1) extracting pilot data of the each input signal;

2) multiplying the pilot data of the each input signal by a conjugate of a known pilot sequence so as to obtain a discrete phase noise estimation value; and 3) performing an interpolation on the discrete phase noise estimation value by using an interpolator so as to obtain the phase noise estimation value of the input signal.

As an optional implementation manner, an implementation flow of the performing the channel estimation on the input signal by using the phase noise estimation value of the input signal so as to obtain the channel estimation value of the input signal may be as follows:

1) multiplying the input signal by a constant matrix A by using a matrix multiplier so as to obtain a first multiplication result;

2) multiplying the first multiplication result by a conjugate of the phase noise estimation value by using the matrix multiplier so as to obtain a second multiplication result; and 3) multiplying the second multiplication result by a constant matrix B by using the matrix multiplier so as to obtain the channel estimation value of the input signal, where the constant matrix $A=pinv(S)$, the constant matrix $B=pinv(delta*S^H)$; pinv represents an inverse operation; S is a training sequence formed by pilots; and $delta*S^H$ represents selecting the first L lines of $S^H$, L is the number of multiple paths, delta is an $L \times Np$ matrix, and the first L lines of the $L \times Np$ matrix are an I matrix and the rest part is 0.

In Embodiment 1 of the present invention, the influence of the phase noise is considered during the channel estimation, so that precision of the channel estimation is effectively improved, and the improvement of the precision of the channel estimation facilitates the fast convergence of the equalizer, thereby reducing a bit error rate of the system.

In Embodiment 1 of the present invention, first, the phase estimation is performed on the phase noise in each equalized signal output by the equalizer so as to obtain the estimated phase of the phase noise; secondly, before the equalized signal is input into the phase-locked loop, the phase rotation is performed on the equalized signal to offset the estimated phase of the phase noise, so as to obtain the phase rotation signal and input the phase rotation signal into the phase-locked loop, the phase-locked loop further suppresses residual phase noise in the phase rotation signal and outputs the error signal and the received signal. Since the phase rotation is performed on the each equalized signal to offset the estimated phase of the phase noise, which can filter out most of the phase noise in the equalized signal, the residual phase noise in the phase rotation signal may be suppressed by using the phase-locked loop with the relatively narrow bandwidth, so that suppression capability on the phase noise can be effectively improved in Embodiment 1 of the present invention under the condition that the bandwidth of the phase-locked loop is relatively narrow.

Embodiment 2

Figure 2:
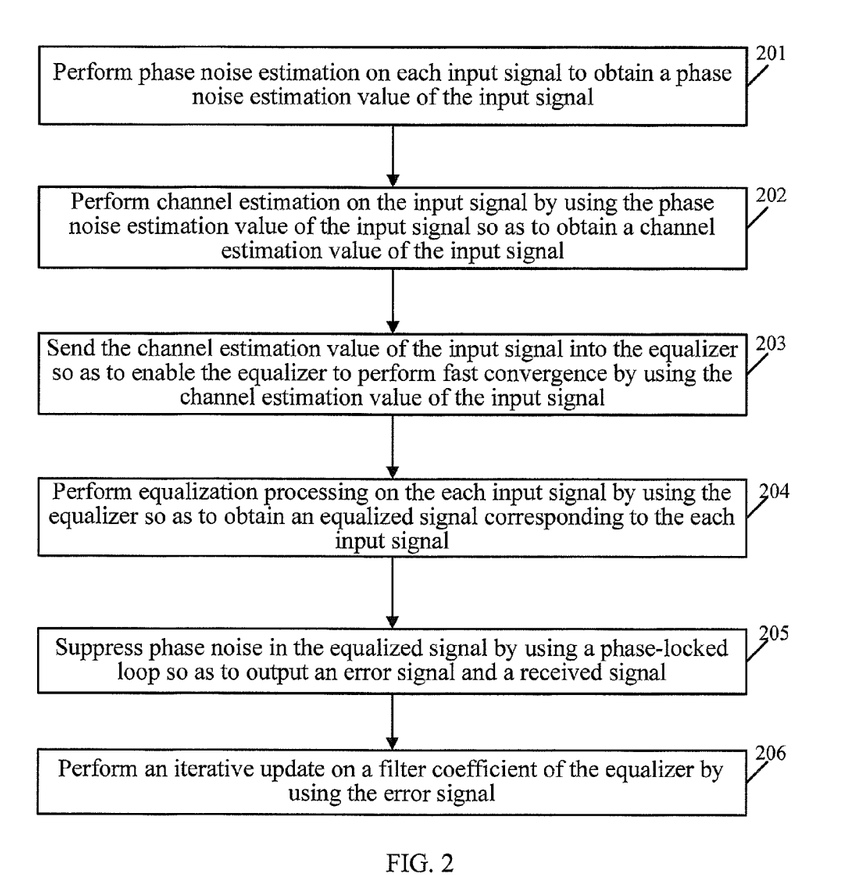
FIG. 2 is a flow chart of another signal processing method applied to a microwave communication system according to an embodiment of the present invention.

Referring to FIG. 2, FIG. 2 is a flow chart of a signal processing method applied to a microwave communication system according to Embodiment 2 of the present invention. Through the method shown in FIG. 2, phase noise can be effectively suppressed when the phase noise of an input signal is relatively small, and an equalizer can be enabled to be fast converged. As shown in FIG. 2, the method may include the following steps:

201: Perform phase noise estimation on each input signal to obtain a phase noise estimation value of the input signal.

An implementation flow of the foregoing step 201 is described in detail in Embodiment 1, which is not repeatedly described again in Embodiment 2 of the present invention.

202: Perform channel estimation on the input signal by using the phase noise estimation value of the input signal so as to obtain a channel estimation value of the input signal.

An implementation flow of the foregoing step 202 is described in detail in Embodiment 1, which is not repeatedly described again in Embodiment 2 of the present invention.

203: Send the channel estimation value of the input signal into the equalizer so as to enable the equalizer to perform fast convergence by using the channel estimation value of the input signal.

204: Perform equalization processing on the each input signal by using the equalizer so as to obtain an equalized signal corresponding to the each input signal.

205: Suppress phase noise in the equalized signal by using a phase-locked loop so as to output an error signal and a received signal.

206: Perform an iterative update on a filter coefficient of the equalizer by using the error signal.

As an optional implementation manner, when the number of input signals received by the equalizer is at least two, the method shown in FIG. 2 may further include the following steps:

by using a combiner, superposing all of received signals output by the phase-locked loop so as to form a received signal, where the number of the received signals output by the phase-locked loop is the same as the number of the input signals.

In Embodiment 2 of the present invention, the phase noise estimation is performed on the each input signal to obtain the phase noise estimation value of the input signal, the channel estimation is performed on the input signal by using the phase noise estimation value of the input signal so as to obtain the channel estimation value, the channel estimation value is sent into the equalizer, and the equalizer then performs fast convergence by using the channel estimation value of the input signal. At the same time, the equalization processing is performed on the each input signal by using the equalizer so as to obtain the equalized signal corresponding to the input signal, and the phase noise in the equalized signal is suppressed by using the phase-locked loop, so as to output the error signal and the received signal. The influence of the phase noise is considered during the channel estimation, so that the precision of the channel estimation is effectively improved, and the improvement of the precision of the channel estimation facilitates the fast convergence of the equalizer, thereby reducing a bit error rate of the system.

Embodiment 3

Figure 3:
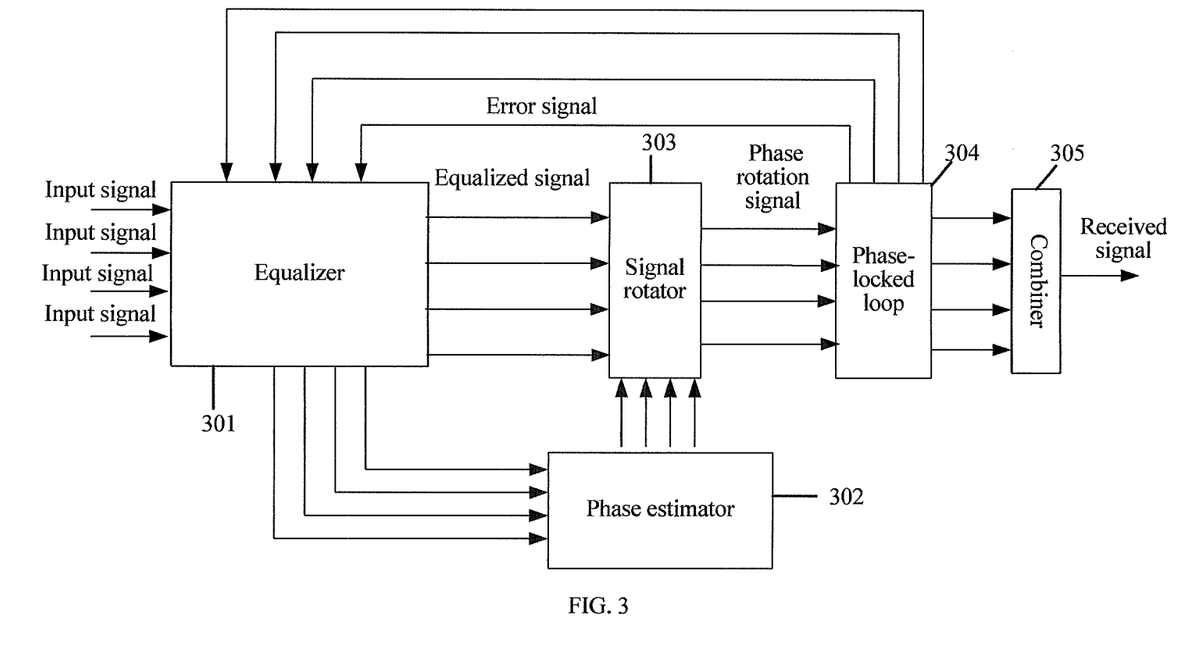
FIG. 3 is a structural diagram of a signal processing device applied to a microwave communication system according to an embodiment of the present invention.

Referring to FIG. 3, FIG. 3 is a structural diagram of a signal processing device applied to a microwave communication system according to Embodiment 3 of the present invention. As shown in FIG. 3, the signal processing device may at least include an equalizer 301, a phase estimator 302, a signal rotator 303, and a phase-locked loop 304.

The equalizer 301 is configured to perform equalization processing on each input signal to obtain an equalized signal corresponding to the each input signal, and output the equalized signal to the phase estimator 302 and the signal rotator 303.

If the number of input signals is at least two, the equalizer 301 may be a space-time equalizer; and if only one input signals exists, the equalizer 301 may be a time-domain equalizer or a frequency-domain equalizer, which is not limited in the embodiment of the present invention.

The phase estimator 302 is configured to perform phase estimation on the phase noise in the equalized signal to obtain an estimated phase of the phase noise and output the estimated phase to the signal rotator 303.

The signal rotator 303 is configured to perform phase rotation on the equalized signal to offset the estimated phase of the phase noise, so as to obtain a phase rotation signal and output the phase rotation signal to the phase-locked loop 304.

The phase-locked loop 304 is configured to suppress residual phase noise in the phase rotation signal to output an error signal and a received signal.

The equalizer 301 is further configured to perform an iterative update on its filter coefficient by using the error signal output by the phase-locked loop 304.

As an optional implementation manner, if the number of the input signals received by the equalizer 301 is at least two, the signal processing device shown in FIG. 3 may further include:

a combiner 305, configured to superpose all of received signals output by the phase-locked loop 304 so as to form a received signal, where the number of the received signals output by the phase-locked loop 304 is the same as the number of the input signals.

Figure 4:
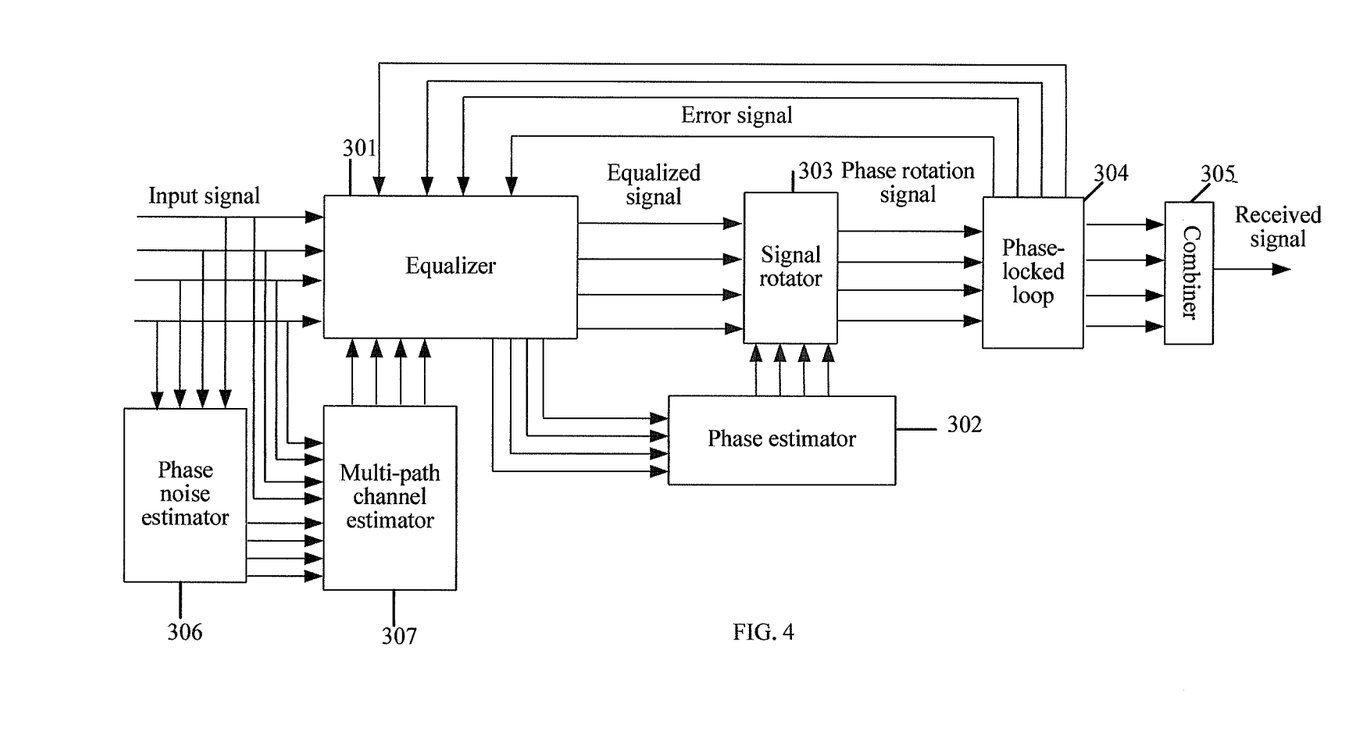
FIG. 4 is a structural diagram of another signal processing device applied to a microwave communication system according to an embodiment of the present invention.

Referring to FIG. 4 together, FIG. 4 is a structural diagram of another signal processing device applied to the microwave communication system according to Embodiment 3 of the present invention. The signal processing device shown in FIG. 4 is obtained by optimizing the signal processing device shown in FIG. 3. As shown in FIG. 4, the signal processing device further includes:

a phase noise estimator 306, configured to perform phase noise estimation on each input signal to obtain a phase noise estimation value of the input signal; and a multi-path channel estimator 307, configured to perform channel estimation on the input signal by using the phase noise estimation value of the input signal, so as to obtain a channel estimation value and send the channel estimation value into the equalizer.

The equalizer 301 is further configured to perform fast convergence by using the channel estimation value.

In Embodiment 3 of the present invention, the influence of the phase noise is considered by the multi-path channel estimator 307 during the channel estimation, so that the precision of the channel estimation is effectively improved, and the improvement of the precision of the channel estimation facilitates the fast convergence of the equalizer 301, thereby reducing a bit error rate of the system.

Figure 5:
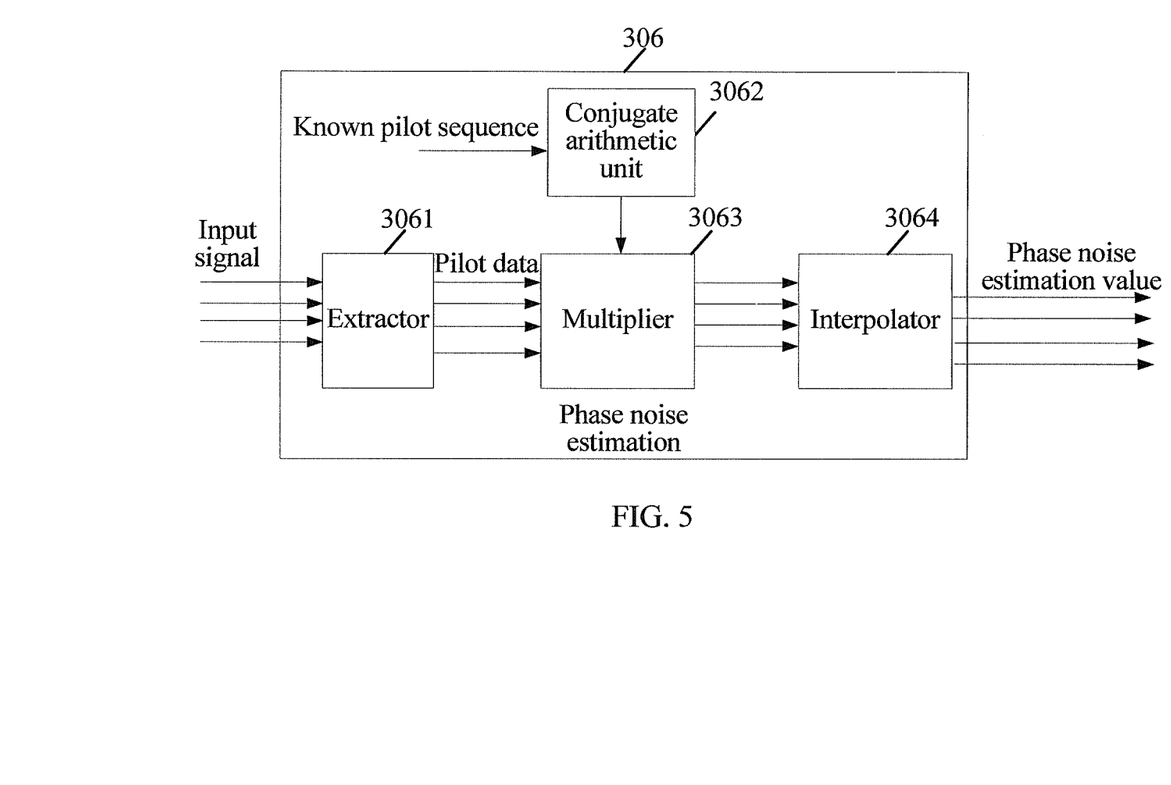
FIG. 5 is a structural diagram of a phase noise estimator according to an embodiment of the present invention.

Referring to FIG. 5 together, FIG. 5 is a structural diagram of the phase noise estimator 306 according to Embodiment 3 of the present invention. As shown in FIG. 5, the phase noise estimator 306 may include:

an extractor 3061, configured to extract pilot data of each input signal;

a conjugate arithmetic unit 3062, configured to calculate a conjugate of a known pilot sequence;

a multiplier 3063, configured to multiply the pilot data by the conjugate of the known pilot sequence so as to obtain a discrete phase noise estimation value, where a specific principle of the multiplying the pilot data by the conjugate of the known pilot sequence so as to obtain the discrete phase noise estimation value is familiar to persons skilled in the art, and is not further introduced in the embodiment of the present invention; and an interpolator 3064, configured to perform an interpolation on the discrete phase noise estimation value to obtain the phase noise estimation value of the input signal.

Figure 6:
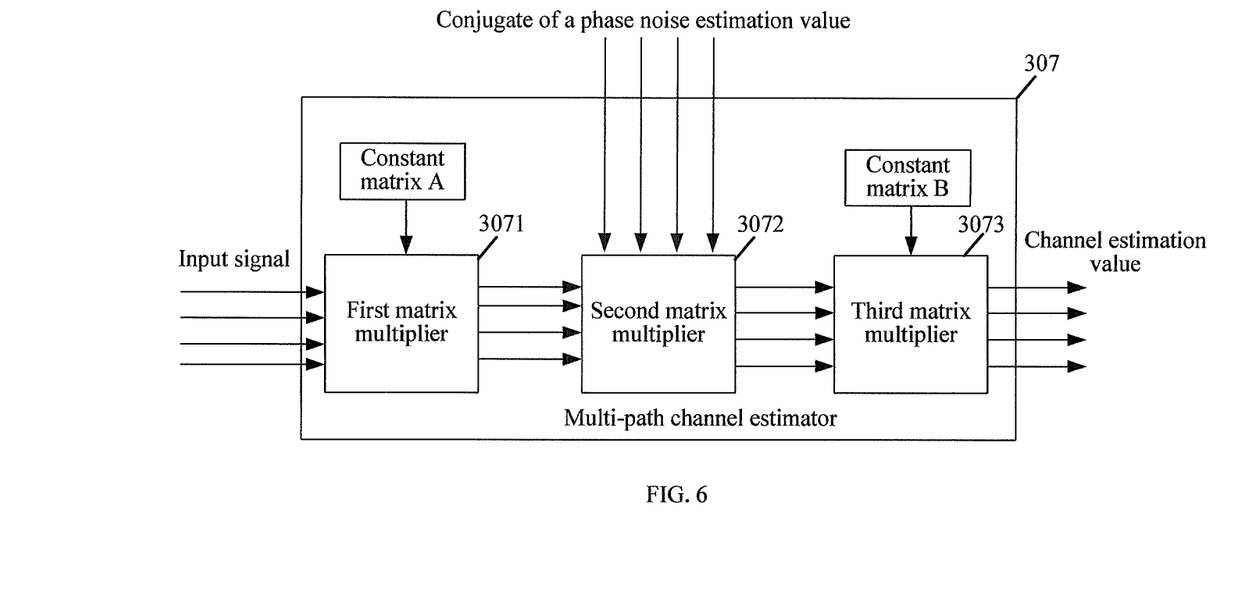
FIG. 6 is a structural diagram of a multi-path channel estimator according to an embodiment of the present invention.

Referring to FIG. 6 together, FIG. 6 is a structural diagram of the multi-path channel estimator 307 according to Embodiment 3 of the present invention. As shown in FIG. 6, the multi-path channel estimator 307 may include:

a first matrix multiplier 3071, configured to multiply each input signal by a constant matrix A so as to obtain a first multiplication result;

a second matrix multiplier 3072, configured to multiply the first multiplication result by a conjugate of the phase noise estimation value so as to obtain a second multiplication result; and a third matrix multiplier 3073, configured to multiply the second multiplication result by a constant matrix B so as to obtain the channel estimation value of the input signal, where the constant matrix A=pinv(S), the constant matrix B=pinv(delta*SH); pinv represents an inverse operation; S is a training sequence formed by pilots; and delta*SH represents selecting the first L lines of SH, L is the number of multiple paths, delta is an L×Np matrix, and the first L lines of the L×Np matrix are an I matrix and the rest part is 0.

Figure 7:
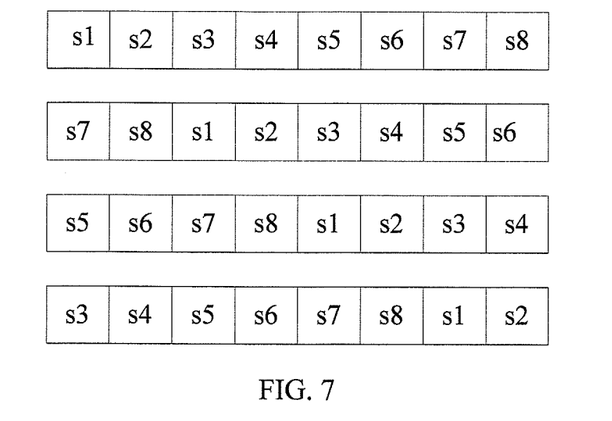
FIG. 7 is a structural diagram of an orthogonal long pilot according to an embodiment of the present invention.

In the phase noise estimator shown in FIG. 5 and the multi-path channel estimator shown in FIG. 6, a pilot may adopt an orthogonal long pilot structure, and the orthogonal long pilot only appears once in one frame. An orthogonal code may adopt a CAZAC code, or another sequence. A 4×4 MIMO transmission environment is taken as an example, it is assumed that the length of the orthogonal long pilot is 8, and the structure of the orthogonal long pilot may be shown in FIG. 7, where the pilot data Si (i=1~Np, Np is the pilot length) may be represented as Si=exp((j*pi*M*i^2)/Np), where M is an integer greater than 0, and pi=3.1415926.

Figure 8:
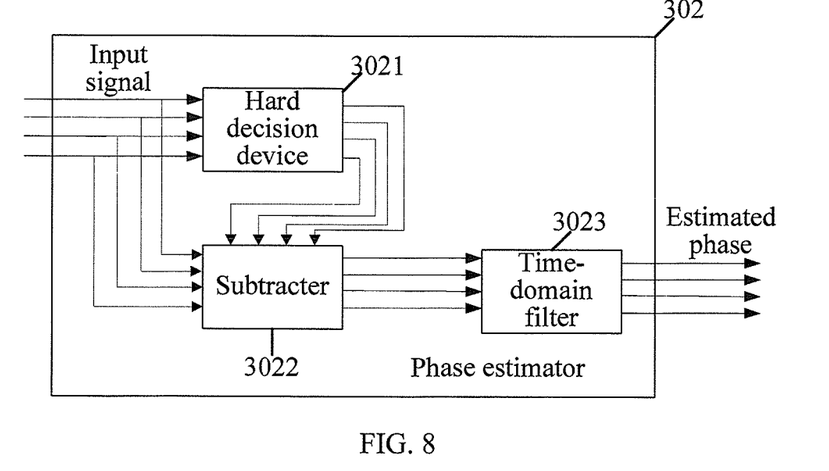
FIG. 8 is a structural diagram of a phase estimator according to an embodiment of the present invention.

Referring to FIG. 8 together, FIG. 8 is a structural diagram of the phase estimator 302 according to Embodiment 3 of the present invention. As shown in FIG. 8, the phase estimator 302 may include:

a hard decision device 3021, configured to perform a hard decision on the equalized signal to obtain a phase of the equalized signal after the hard decision;

a subtracter 3022, configured to calculate a phase difference between a phase of the equalized signal before the hard decision and the phase of the equalized signal after the hard decision; and a time-domain filter 3023, configured to perform an iterative update on the phase difference to obtain the estimated phase of the phase noise in the equalized signal.

The time-domain filter 3023 may be implemented by adopting a minimum mean square error algorithm.

A specific implementation process of the performing, by the time-domain filter 3023, the iterative update on the phase difference to obtain the estimated phase of the phase noise in the equalized signal is familiar to persons skilled in the art, and is not further introduced in the embodiment of the present invention.

Figure 9:
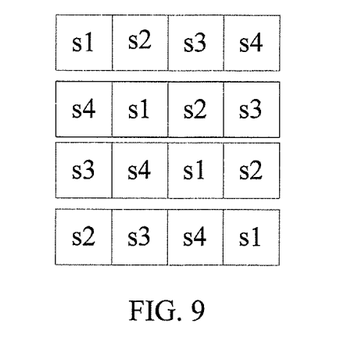
FIG. 9 is a structural diagram of an orthogonal short pilot according to an embodiment of the present invention.

In the phase estimator shown in FIG. 8, the pilot may adopt an orthogonal short pilot structure, and the orthogonal short pilot repeatedly appears in one frame. An orthogonal code may adopt the CAZAC code, or another sequence. The 4×4 MIMO transmission environment is taken as an example, it is assumed that the length of the orthogonal short pilot is 4, and the structure of the orthogonal short pilot may be shown in FIG. 9, where the pilot data Si (i=1~Np, Np is the pilot length) may be represented as Si=exp((j*pi*M*i^2)/Np), where M is an integer greater than 0.

In Embodiment 3 of the present invention, the phase estimator 302 performs the phase estimation on the phase noise in each equalized signal output by the equalizer 301 so as to obtain the estimated phase of the phase noise; secondly, the signal rotator 303 performs the phase rotation on the equalized signal to offset the estimated phase of the phase noise so as to obtain the phase rotation signal and input the phase rotation signal into the phase-locked loop 304, and the phase-locked loop 304 further suppresses the residual phase noise in the phase rotation signal and outputs the error signal and the received signal. Since the phase rotation is performed on the each equalized signal to offset the estimated phase of the phase noise, which can filter out most of the phase noise in the equalized signal, the residual phase noise in the phase rotation signal may be suppressed by using the phase-locked loop with a relatively narrow bandwidth, so that suppression capability on phase noise can be effectively improved in the embodiment of the present invention under the condition that the bandwidth of the phase-locked loop is relatively narrow.

Embodiment 4

Figure 10:
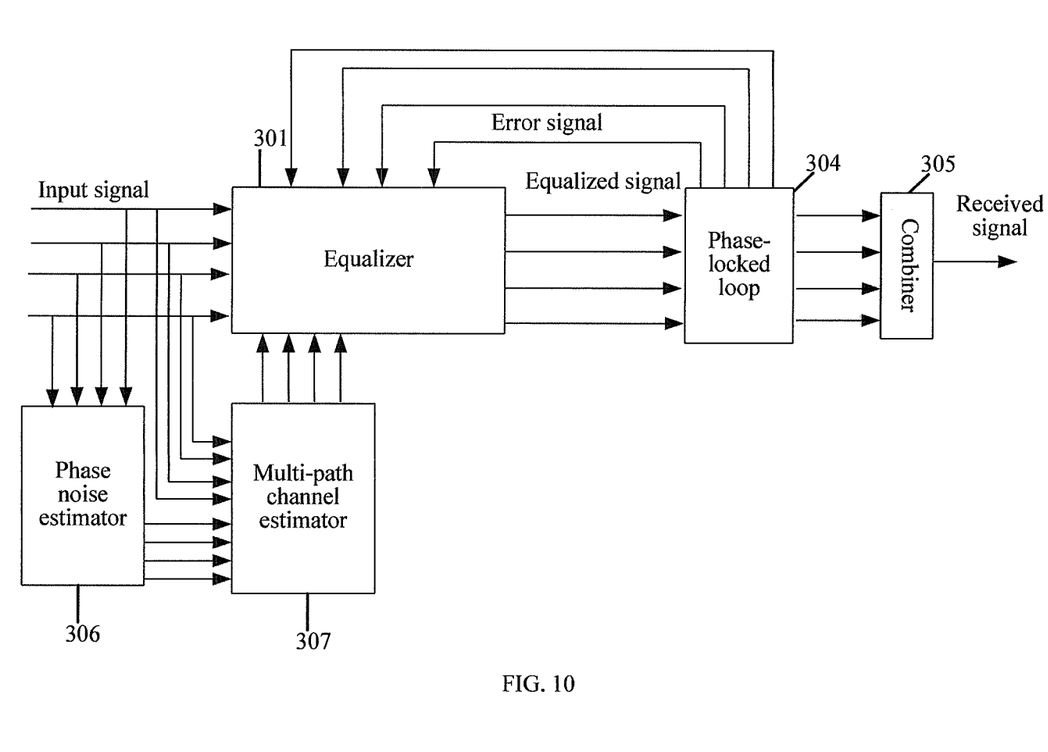
FIG. 10 is a structural diagram of another signal processing device applied to a microwave communication system according to an embodiment of the present invention.

Referring to FIG. 10, FIG. 10 is a structural diagram of a signal processing device applied to a microwave communication system according to Embodiment 4 of the present invention. The signal processing device shown in FIG. 10 may be applied in a transmission environment with relatively low phase noise. As shown in FIG. 10, the signal processing device may at least include an equalizer 301, a phase-locked loop 304, a phase noise estimator 306, and a multi-path channel estimator 307.

The phase noise estimator 306 is configured to perform phase noise estimation on each input signal to obtain a phase noise estimation value of the input signal.

The structure of the phase noise estimator 306 is introduced in detail in Embodiment 3, and is not repeatedly described again in Embodiment 4 of the present invention.

The multi-path channel estimator 307 is configured to perform channel estimation on the input signal by using the phase noise estimation value, so as to obtain a channel estimation value and send the channel estimation value into the equalizer 301.

The structure of the multi-path channel estimator 307 is introduced in detail in Embodiment 3, and is not repeatedly described again in Embodiment 4 of the present invention.

The equalizer 301 is configured to perform equalization processing on each input signal to obtain an equalized signal corresponding to the input signal and output the equalized signal to the phase-locked loop 304, and perform fast convergence by using the channel estimation value.

The phase-locked loop 304 is configured to suppress the phase noise in the equalized signal to output an error signal and a received signal.

The equalizer 301 is further configured to perform an iterative update on a filter coefficient of the equalizer by using the error signal.

As an optional implementation manner, if the number of input signals received by the equalizer 301 is at least two, the signal processing device shown in FIG. 10 may further include:

a combiner 305, configured to superpose all of received signals output by the phase-locked loop 304 so as to form a received signal, where the number of the received signals output by the phase-locked loop 304 is the same as the number of the input signals.

In Embodiment 4 of the present invention, the phase noise estimator 306 performs the phase noise estimation on the each input signal to obtain the phase noise estimation value of the input signal, the multi-path channel estimator 307 performs the channel estimation on the input signal by using the phase noise estimation value of the input signal so as to obtain the channel estimation value and send the channel estimation value into the equalizer 301, and the equalizer 301 performs the fast convergence by using the channel estimation value of the input signal. At the same time, the equalization processing is performed on the each input signal by using the equalizer 301 so as to obtain the equalized signal corresponding to the input signal, the phase noise in the equalized signal is suppressed by using the phase-locked loop 304, so as to output the error signal and the received signal. The influence of the phase noise is considered during the channel estimation, so that the precision of the channel estimation is effectively improved, and the improvement of the precision of the channel estimation facilitates the fast convergence of the equalizer, thereby reducing a bit error rate of the system.

Persons of ordinary skill in the art should understand that all or a part of the steps of the methods in the foregoing embodiments may be implemented by a program instructing relevant hardware. The program may be stored in a computer readable storage medium. The storage medium may include: a flash disk, a read-only memory (Read-Only Memory, ROM), a random access memory (Random Access Memory, RAM), a magnetic disk, or a compact disk, and so on.

The method and the device which are for signal processing and are applied to the microwave communication system according to the embodiments of the present invention are introduced in detail in the foregoing. The principles and implementation manners of the present invention are illustrated in the specification by applying specific examples. The description of the foregoing embodiments is merely provided for help understand the methods and core ideas of the present invention. Meanwhile, persons of ordinary skill in the art can make variations to the present invention in terms of the specific implementation manners and application scopes according to the ideas of the present invention. In conclusion, the content of the specification shall not be understood as a limit to the present invention.

What is claimed is:

1. A signal processing method applied to a microwave communication system, the method comprising:
    performing phase noise estimation on each input signal to obtain a phase noise estimation value of each input signal;
    performing channel estimation on each input signal by using the phase noise estimation value to obtain a channel estimation value, comprising,
        multiplying each input signal by a constant matrix A by using a first matrix multiplier to obtain a first multiplication result,
        multiplying the first multiplication result by a conjugate of the phase noise estimation value by using a second matrix multiplier to obtain a second multiplication result, and
        multiplying the second multiplication result by a constant matrix B by using a third matrix multiplier to obtain the channel estimation value of each input signal, wherein the constant matrix A=pinv(S), the constant matrix B=pinv(delta*$S^H$); pinv represents an inverse operation; S is a training sequence formed by pilots; and delta*$S^H$ represents selecting first L lines of $S^H$, L is the number of input signals, delta is an L×Np matrix, and the first L lines of the L×Np matrix are an I matrix and the rest part is 0;
    sending the channel estimation value into an equalizer to enable the equalizer to perform fast convergence by using the channel estimation value;
    performing equalization processing on each input signal by using the equalizer to obtain an equalized signal corresponding to each input signal;
    performing phase estimation on phase noise in the equalized signal to obtain an estimated phase of the phase noise;
    performing phase rotation on the equalized signal to offset the estimated phase of the phase noise to obtain a phase rotation signal;
    suppressing residual phase noise in the phase rotation signal by using a phase-locked loop to output an error signal and a received signal; and
    performing an iterative update on a filter coefficient of the equalizer by using the error signal.

2. The signal processing method according to claim 1, wherein the number of input signals is at least two, and the method further comprises:
    by using a combiner, superposing all of received signals output by the phase-locked loop so to form a combined received signal, wherein the number of received signals output by the phase-locked loop is the same as the number of input signals.

3. The signal processing method according to claim 1, wherein performing the phase noise estimation on each input signal to obtain the phase noise estimation value of the each input signal comprises:
    extracting pilot data of each input signal;
    multiplying the pilot data by a conjugate of a known pilot sequence to obtain a discrete phase noise estimation value; and
    performing an interpolation on the discrete phase noise estimation value by using an interpolator to obtain the phase noise estimation value of each input signal.

4. The signal processing method according to claim 1, wherein performing the phase estimation on the phase noise in the equalized signal to obtain the estimated phase of the phase noise comprises:
    performing a hard decision on the equalized signal to obtain a phase of the equalized signal after the hard decision;
    calculating a phase difference between a phase of the equalized signal before the hard decision and the phase of the equalized signal after the hard decision; and
    inputting the phase difference into a time-domain filter to perform the iterative update, so as to obtain the estimated phase of the phase noise in the equalized signal.

5. A signal processing method applied to a microwave communication system, the method comprising:
    performing phase noise estimation on each input signal to obtain a phase noise estimation value of each input signal;
    performing channel estimation on each input signal by using the phase noise estimation value to obtain a channel estimation value, comprising,
        multiplying each input signal by a constant matrix A by using a first matrix multiplier to obtain a first multiplication result,
        multiplying the first multiplication result by a conjugate of the phase noise estimation value by using a second matrix multiplier to obtain a second multiplication result, and
        multiplying the second multiplication result by a constant matrix B by using a third matrix multiplier to obtain the channel estimation value of each input signal, wherein the constant matrix A=pinv(S), the constant matrix B=pinv(delta*$S^H$); pinv represents an inverse operation; and delta*$S^H$ represents selecting the first L lines of $S^H$, L is the number of input signals, delta is an L×Np matrix, the first L lines of the L×Np matrix are an I matrix and the rest part is 0, and the S is a training sequence formed by the pilots;

sending the channel estimation value into an equalizer to enable the equalizer to perform fast convergence by using the channel estimation value;

performing equalization processing on each input signal by using the equalizer to obtain an equalized signal corresponding to each input signal;

suppressing phase noise in the equalized signal by using a phase-locked loop to output an error signal and a received signal; and performing an iterative update on a filter coefficient of the equalizer by using the error signal.

6. The signal processing method according to claim 5, wherein the number of input signals is at least two, and the method further comprises:

by using a combiner, superposing all received signals output by the phase-locked loop to form a combined received signal, wherein the number of received signals output by the phase-locked loop is the same as the number of input signals.

7. The signal processing method according to claim 5 wherein the performing the phase noise estimation on the each input signal to obtain the phase noise estimation value of each input signal comprises:

extracting pilot data of each input signal;

multiplying the pilot data by a conjugate of a known pilot sequence to obtain a multiplication result; and performing at least one interpolation on the data between pilots of each input signal by using the multiplication result so as to obtain the phase noise estimation value of each input signal.

8. A signal processing device applied to a microwave communication system, the device comprising:

a phase noise estimator, configured to perform phase noise estimation on each input signal to obtain a phase noise estimation value of each input signal;

a multi-path channel estimator, configured to perform channel estimation on each input signal by using the phase noise estimation value of each input signal to obtain a channel estimation value and send the channel estimation value into an equalizer;

the equalizer, configured to perform equalization processing on each input signal to obtain an equalized signal corresponding to each input signal, and output the equalized signal to a phase estimator and a signal rotator, and perform fast convergence by using the channel estimation value;

the phase estimator, configured to perform phase estimation on phase noise in the equalized signal to obtain an estimated phase of the phase noise, and output the estimated phase to the signal rotator;

the signal rotator, configured to perform phase rotation on the equalized signal to offset the estimated phase of the phase noise to obtain a phase rotation signal and output the phase rotation signal to a phase-locked loop;

the phase-locked loop, configured to suppress residual phase noise in the phase rotation signal to output an error signal and a received signal, wherein the equalizer is further configured to perform an iterative update on a filter coefficient of the equalizer by using the error signal; and wherein the multi-path channel estimator comprises:

a first matrix multiplier, configured to multiply each input signal by a constant matrix A to obtain a first multiplication result, a second matrix multiplier, configured to multiply the first multiplication result by a conjugate of the phase noise estimation value to obtain a second multiplication result, and a third matrix multiplier, configured to multiply the second multiplication result by a constant matrix B to obtain the channel estimation value of the each input signal, wherein the constant matrix A=pinv(S), the constant matrix B=pinv(delta*$S^H$); pinv represents an inverse operation; S is a training sequence formed by pilots; and delta*$S^H$ represents selecting the first L lines of $S^H$, L is the number of input signals, delta is an L×Np matrix, and the first L lines of the L×Np matrix are an I matrix and the rest part is 0.

9. The signal processing device according to claim 8, wherein the number of input signals is at least two, and the signal processing device further comprises:

a combiner, configured to superpose all of received signals output by the phase-locked loop so as to form a combined received signal, wherein the number of received signals output by the phase-locked loop is the same as the number of input signals.

10. The signal processing device according to claim 8, wherein the phase noise estimator comprises:

an extractor, configured to extract pilot data of each input signal;

a conjugate arithmetic unit, configured to calculate a conjugate of a known pilot sequence;

a multiplier, configured to multiply the pilot data by the conjugate of the known pilot sequence to obtain a discrete phase noise estimation value; and an interpolator, configured to perform an interpolation on the discrete phase noise estimation value to obtain the phase noise estimation value of each input signal.

11. The signal processing device according to claim 8, wherein the phase estimator comprises:

a hard decision device, configured to perform a hard decision on the equalized signal to obtain a phase of the equalized signal after the hard decision;

a subtracter, configured to calculate a phase difference between a phase of the equalized signal before the hard decision and the phase of the equalized signal after the hard decision; and a time-domain filter, configured to perforin an iterative update on the phase difference to obtain the estimated phase of the phase noise in the equalized signal.

12. A signal processing device applied to a microwave communication system, the device comprising:

a phase noise estimator, configured to perform phase noise estimation on each input signal to obtain a phase noise estimation value of each input signal;

a multi-path channel estimator, configured to perform channel estimation on each input signal by using the phase noise estimation value to obtain a channel estimation value and send the channel estimation value into an equalizer;

the equalizer, configured to perform equalization processing on each input signal to obtain an equalized signal corresponding to each input signal and output the equalized signal to a phase-locked loop, and perform fast convergence by using the channel estimation value;

the phase-locked loop, configured to suppress phase noise in the equalized signal to output an error signal and a received signal, wherein the equalizer is further configured to perform an iterative update on a filter coefficient of the equalizer by using the error signal; and wherein the multi-path channel estimator comprises:
a first matrix multiplier, configured to multiply each input signal by a constant matrix A to obtain a first multiplication result,
a second matrix multiplier, configured to multiply the first multiplication result by a conjugate of the phase noise estimation value to obtain a second multiplication result, and
a third matrix multiplier, configured to multiply the second multiplication result by a constant matrix B to obtain the channel estimation value of each input signal, wherein the constant matrix A=pinv(S), the constant matrix B=pinv(delta*$S^H$); pinv represents an inverse operation; S is a training sequence foamed by pilots; and delta*$S^H$ represents selecting the first L lines of $S^H$, L is the number of input signals, delta is an L×Np matrix, and the first L lines of the L×Np matrix are an I matrix and the rest part is 0.

13. The signal processing device according to claim 12, wherein the number of input signals is at least two, and the signal processing device further comprises:

a combiner, configured to superpose all received signals output by the phase-locked loop to form a combined received signal, wherein the number of received signals output by the phase-locked loop is the same as the number of input signals.

14. The signal processing device according to claim 12, wherein the phase noise estimator comprises:

an extractor, configured to extract pilot data of each input signal;

a conjugate arithmetic unit, configured to calculate a conjugate of a known pilot sequence;

a multiplier, configured to multiply the pilot data by the conjugate of the known pilot sequence to obtain a discrete phase noise estimation value; and an interpolator, configured to perform an interpolation on the discrete phase noise estimation value to obtain the phase noise estimation value of each input signal.

* * * * *